(No Model.)
E. N. DICKERSON, Jr.
SYSTEM OF ELECTRICAL CONVERSION.
No. 377,994.    Patented Feb. 14, 1888.
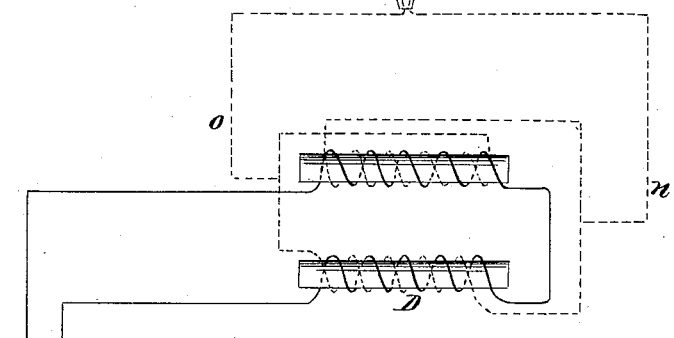
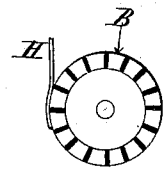
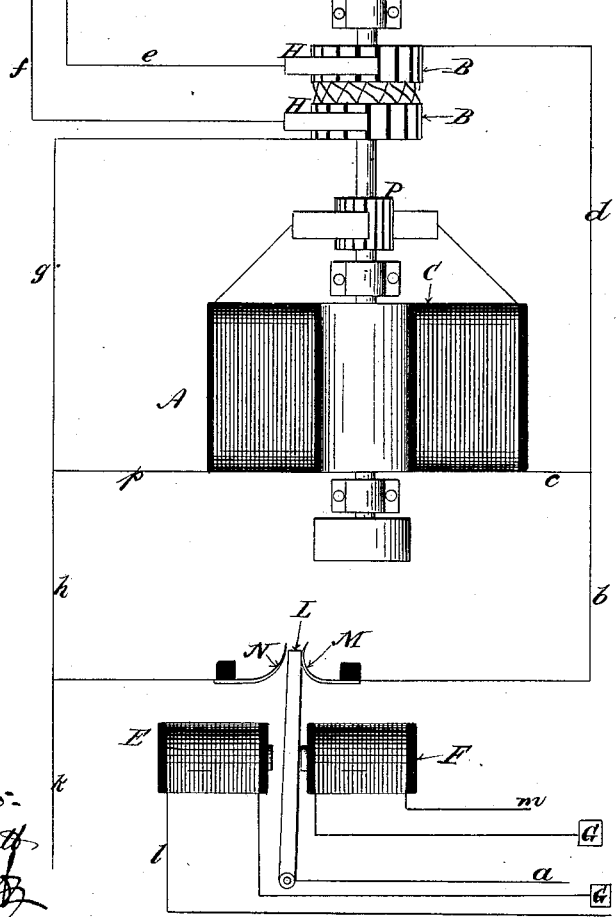
Witnesses:
Geo. H. Miatt
Anthony Erel
Inventor:
E. N. Dickerson Jr.

UNITED STATES PATENT OFFICE.

EDWARD N. DICKERSON, JR., OF NEW YORK, N. Y.

SYSTEM OF ELECTRICAL CONVERSION.

SPECIFICATION forming part of Letters Patent No. 377,994, dated February 14, 1888.

Application filed July 22, 1887. Serial No. 244,969. (No model.)

*To all whom it may concern:*

Be it known that I, EDWARD N. DICKERSON, Jr., of the city, county, and State of New York, have invented a new and useful Improvement in Systems of Electrical Conversion, of which the following is a full, true, and exact description, reference being had to the accompanying drawings.

My invention relates to a system by which a non-reversing high-tension electric current may be converted into a low-tension reversing-current at the point where it is desired to employ it.

It is well known that it would be very desirable to convert a high-tension arc current—such as is ordinarily employed—into a low-tension current suitable for incandescent lighting in the house. This has been impossible to obtain, excepting when the high-tension current was itself a reversing-current. The disadvantages of this current are too well known to require full explanation.

By my attachment I can take from an ordinary non-reversing high-tension current electricity which will serve to furnish a low-tension reversing-current in the house or locality where it is desired to use it. I accomplish this result by combining an electrical converter of a type known as the "Westinghouse Converter" with a reversing-motor, which controls the polarity of the main circuit, and which is located at the point where it is desired to take off the branch circuit.

Though my apparatus is primarily designed to convert a high-tension into a low-tension current, it is equally applicable for the conversion of any direct into a reversing current of different tension by variations in the winding of the Westinghouse converter.

My invention will be readily understood from the accompanying drawings, in which similar letters refer to similar parts.

Figure 1 represents a view of the main-circuit system; Fig. 2, a detailed view of the commutator.

A high-tension current flows out upon the circuit *a* and returns to the generator by the circuit *k*. By the switch L it passes to the spring M; thence by the circuit *b c p h k* it passes through the motor C, which is operated by its own commutator P, in the usual manner. On the shaft of this motor is arranged the double-reversing commutator B B, the sections of which are alternately connected, as shown, one set of sections being connected with the circuit *d* and the other with the circuit *g*. The commutator-springs are made just broad enough to lap two sections, so as to prevent the breaking of the current, and these commutator-springs H H connect with the circuits *e f*, which go to the Westinghouse converter D.

In the drawings the lap of the springs H is shown greater than need be. It is sufficient that the contact of these springs be simply great enough to span the insulation. It is obvious that other forms of reversing-commutator could be employed.

It is obvious that the current upon the circuits *e f* is a high-tension reversing-current, and therefore will operate the converter D, which further converts a reversing high-tension current into a reversing low-tension current, which passes out in the secondary circuit *n o* and may be used to light the incandescent light K. This converter and motor are supposed to be located together, by preference without a house, and the circuit *n o* enters the house.

A switch, E F, puts the apparatus in operation. If the switch be held to the left by the magnet E, the high-tension current passes directly by the switch L, spring N, to the circuit *k*, without passing into the apparatus. Under these circumstances a second current is sent through the wire *l* to ground G. If this second current is sent through the wire *m* to ground G, then the switch L is thrown against spring M, and then the current passes by the wire *a* to the junction between *b* and *c*. The resistance of the motor A, which acts as a shunt-resistance, forces the desired proportion of current by the wire *d*, through the reversing-switch, the circuit *e* and *f*, and circuit *g*, back to the generator. In case it is not desired to use this shunt device the motor can be operated by an independent current entering by the wires *p c*, which would then be disconnected from the main circuit. The difference between these two arrangements is one of economy merely, two circuits being required in the latter case.

It is obvious, of course, that the switch E F may be omitted; but by it I am enabled to throw any house into circuit from the central office.

What I claim as my invention, and desire to secure by Letters Patent, is—

1. The system of electrical conversion herein described, which consists in causing a direct current to flow upon a main circuit and through a current-reverser in reversing a subordinate circuit supplied from the main circuit, and in converting the said reversing-circuit into a circuit of different tension by means of a converter, substantially as described.

2. The combination of a main circuit carrying a direct current, a reversing apparatus for reversing a subordinate circuit derived from said main circuit and driven from the main circuit, a converter for converting said reversing-circuit into a circuit of a different electrical tension, and a circuit connected with said converter for carrying said converted current, substantially as described.

3. The combination of the circuit $a\,k$, carrying a direct current, a reversing-commutator, B B, operated by a motor, A, the circuit $e\,f$, carrying a current from the commutator to the converter, the converter D, and the subordinate converted circuit $n\,o$, carrying the electricity to the point where it is utilized, substantially as described.

4. The combination of the circuit $a\,k$, carrying a direct current, a reversing-commutator, B B, operated by a motor, A, driven from the main circuit, the circuit $e\,f$, carrying a current from the commutator to the converter, the converter D, and the subordinate converted circuit $n\,o$, carrying the electricity to the point where it is utilized, substantially as described.

5. The combination of the circuit $a\,k$, carrying a direct current, a reversing-commutator, B B, operated by a motor, A, driven from the main circuit and acting as a resistance to force the required current through the reversing-commutator, the circuit $e\,f$, carrying a current from the commutator to the converter, the converter D, and the subordinate converted circuit $n\,o$, carrying the electricity to the point where it is utilized, substantially as described.

6. The combination of the switch L, the circuit $a\,k$, controlled by said switch, the motor A, operated from the main circuit, the converting-commutator B B, converting said main circuit through circuit $e\,f$, carrying a current from the commutator to the converter, the converter D, and the circuit $n\,o$, carrying the electricity to the point where it is utilized, substantially as described.

In testimony whereof I have signed my name to this specification in the presence of two subscribing witnesses.

E. N. DICKERSON, JR.

Witnesses:
   ANTHONY GREF,
   H. COUTANT.